United States Patent [19]

Bader et al.

[11] Patent Number: 5,665,283
[45] Date of Patent: Sep. 9, 1997

[54] PROCESS FOR DETERMINING THE CHANGEOVER POINT WHEN PRODUCING PLASTIC INJECTION MOULDINGS AND DIE-CASTINGS

[75] Inventors: Christopherus Bader, Neftenbach; Luigi Greco, Pfyn, both of Switzerland

[73] Assignee: K.K. Holding AG, Winterthur, Switzerland

[21] Appl. No.: 529,536

[22] Filed: Sep. 18, 1995

[30] Foreign Application Priority Data

Oct. 19, 1994 [CH] Switzerland ............ 03135/94

[51] Int. Cl.$^6$ ............ B29C 45/77
[52] U.S. Cl. ............ 264/40.1; 164/155.1; 164/155.3; 264/40.5; 264/328.1; 425/145
[58] Field of Search ............ 264/40.1, 40.5, 264/328.1; 425/145, 149; 364/476, 475.08, 475.05; 164/155.1, 155.3, 155.5

[56] References Cited

U.S. PATENT DOCUMENTS 5,356,575  10/1994  Krosse et al. ............ 425/145
5,514,311   5/1996  Shimizu et al. ............ 425/145

FOREIGN PATENT DOCUMENTS 535274    4/1993  European Pat. Off. ............ 425/145
A 4140392 6/1993  Germany .
52-31903  8/1977  Japan ............ 425/145

Primary Examiner—Jill L. Heitbrink
Attorney, Agent, or Firm—Barnes & Thornburg

[57] ABSTRACT

When producing injection-moulded or die-cast articles the changeover point between a filling program and a subsequent hold pressure program is determined by measuring the pressure inside the mould cavity at regular intervals, and deriving two classification variables ($k_0^+$, $k_0^-$, $k_{-1}^+$, $k_{-1}^-$, $k_{-2}^+$, $k_{-2}^-$) from each of the last three measured values ($p_0$, $p_{-1}$, $p_{-2}$) in classification stages ($K_0$, $K_{-1}$, $K_{-2}$) and combining them into weighting variables ($g^-$, $g^0$, $g^+$) in a logic stage (V) using the methods of fuzzy logic. In an evaluation stage (A), by means of evaluation functions a switching value (s) is derived from these and compared with a threshold value in a decision stage (E). If the switching value oversteps the threshold, it is deduced that the changeover point has been reached.

19 Claims, 6 Drawing Sheets

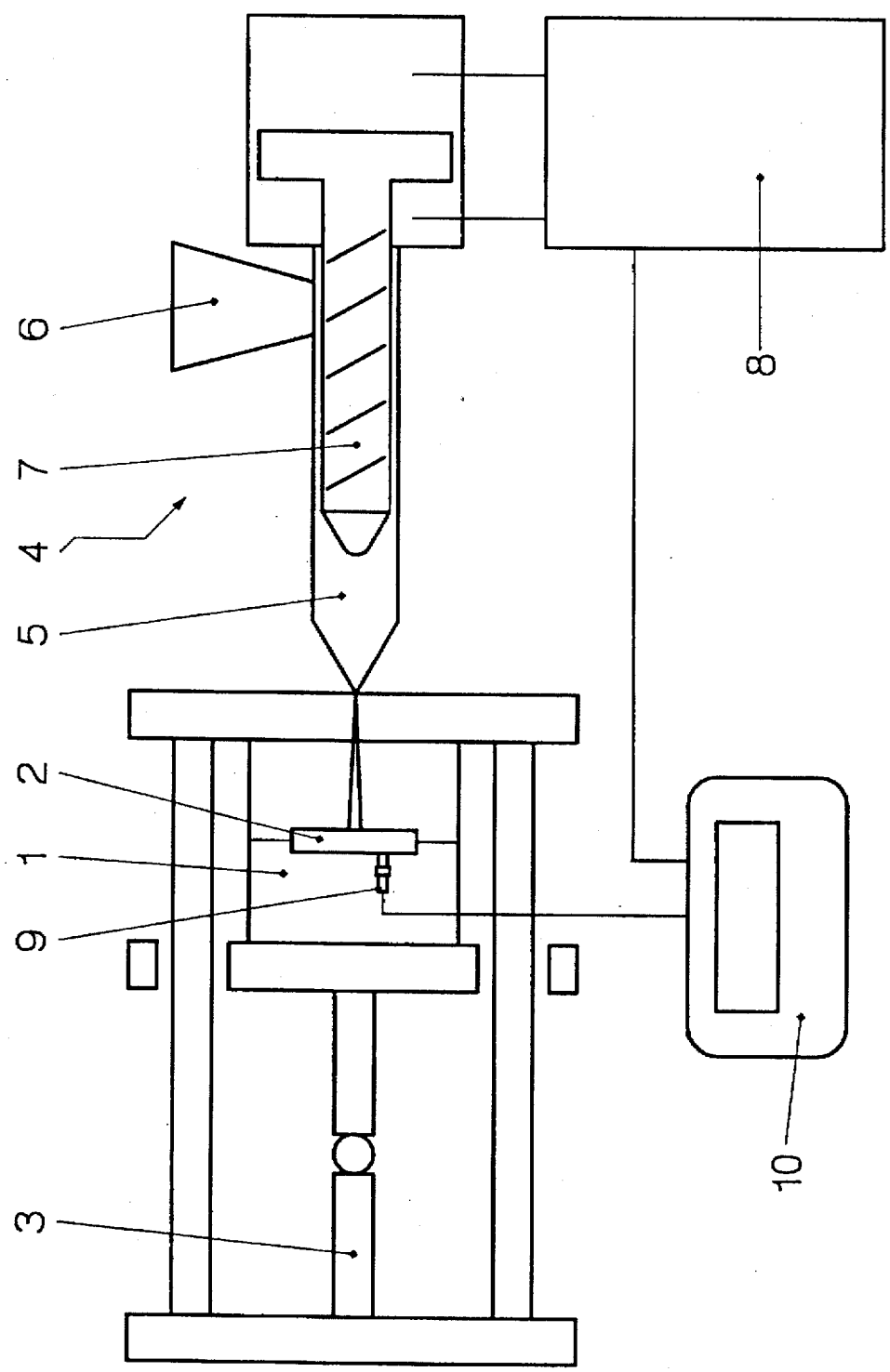

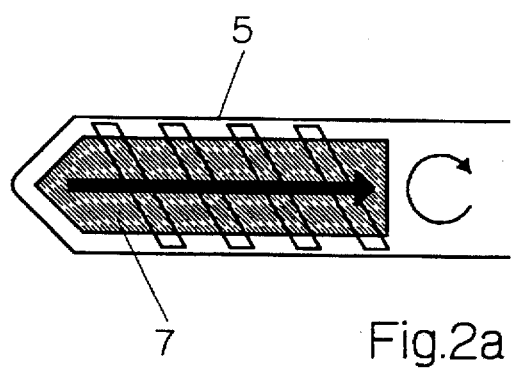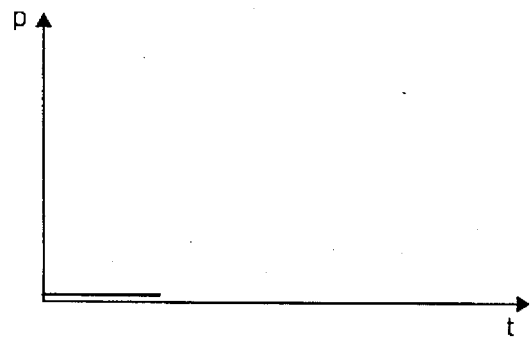
Fig.2a  Fig.2b
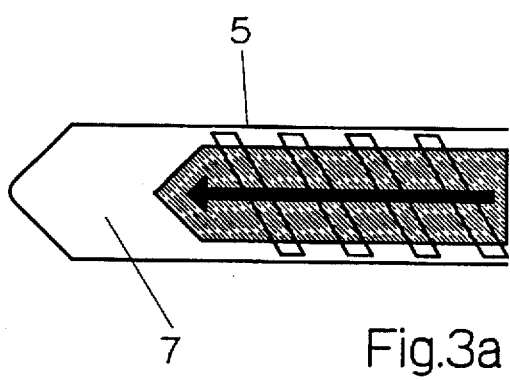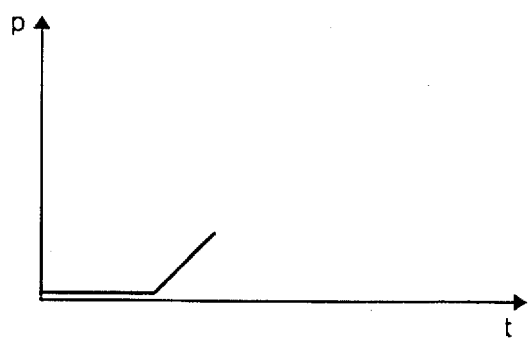
Fig.3a  Fig.3b

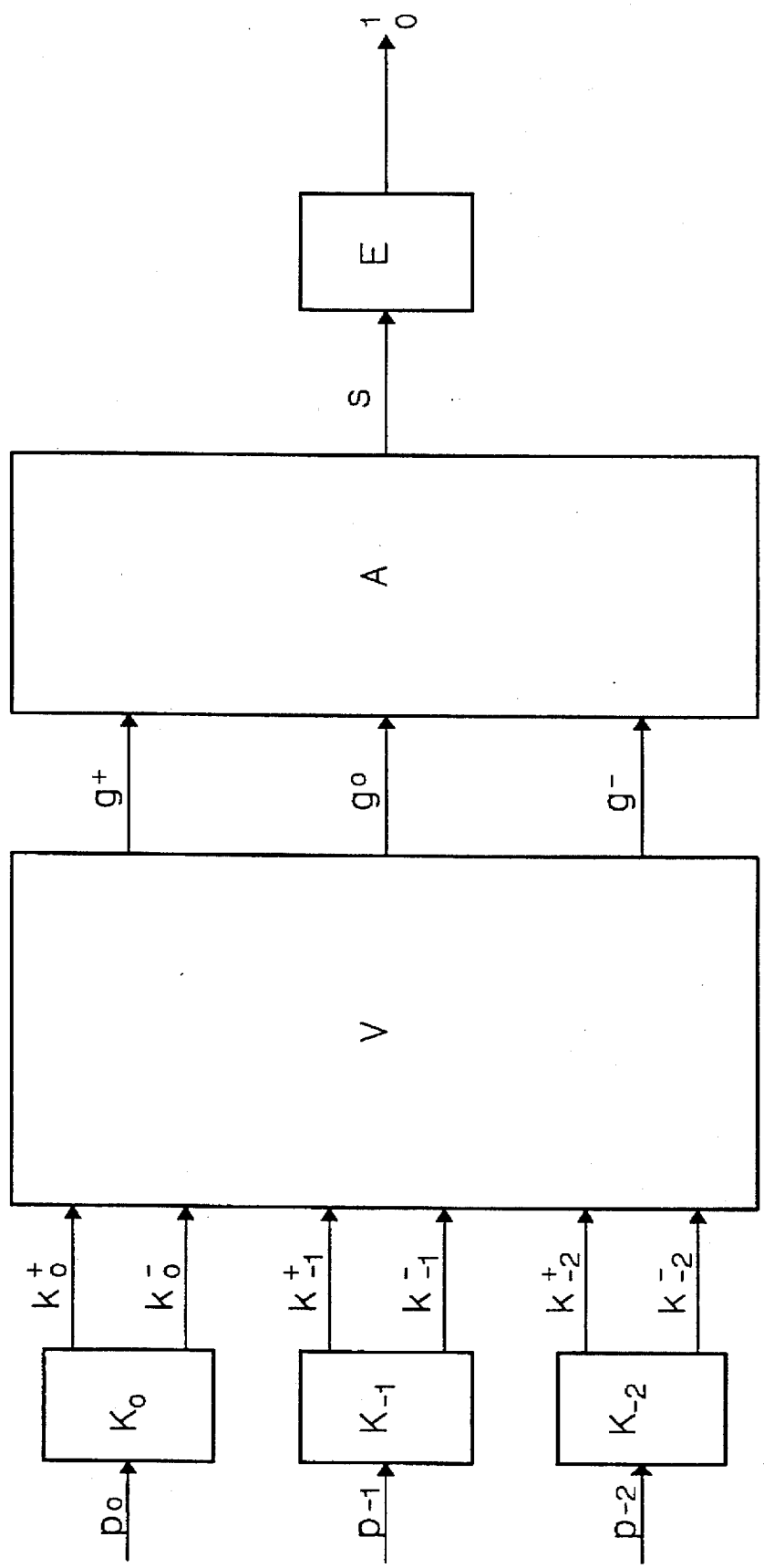

PROCESS FOR DETERMINING THE CHANGEOVER POINT WHEN PRODUCING PLASTIC INJECTION MOULDINGS AND DIE-CASTINGS

BACKGROUND AND SUMMARY OF THE INVENTION

The invention relates to a process for determining the changeover point in the production of plastic injection mouldings and die-castings.

When producing injection mouldings and die-castings of plastics, metals or ceramics, plastic material is injected into the cavity of a mould by means of suitable injection arrangements, after which it solidifies by cooling or is cured. The mould is then opened and the moulding is ejected. Injection takes place in two phases. During the filling phase the mould is filled, for which the injection arrangements are usually controlled to a filling program so that the delivery rate versus time meets certain setpoints. As soon as the mould is filled, as a rule the injection arrangements are controlled during a hold pressure phase so that the pressure in the cavity reaches certain setpoints, which may also be time-dependent, according to a hold pressure program.

It is very important that the changeover point, i.e. the point in time at which the changeover from filling program to hold pressure program takes place, is correctly determined and coincides as exactly as possible with the time at which the cavity is just filled completely. If the changeover is premature, there is a danger that the cavity will not be completely filled yet and uncontrolled filling under hold pressure will ensue, resulting in a moulding susceptible to warping under thermal stressing. If the changeover is too late, excessive pressure will be set up inside the cavity, yielding a moulding that is brittle and susceptible to fracture on account of internal stresses.

It is essential therefore that the complete filling of the cavity should be detected before a drastic pressure rise occurs. One process of this kind (DE-A-41 40 392) attempts to solve the problem by determining approximately the second derivative of the pressure as a function of time from measurements of the pressure inside the cavity performed at fixed time intervals, and when this value exceeds a fixed threshold it is assumed that the changeover point has been reached and switchover to the hold pressure program then ensues.

However, this solution has emerged as insufficiently reliable, because considerable pressure fluctuations may occur prior to the complete filling of the mould cavity also, causing the second derivative to exceed the threshold briefly so that premature changeover results. Within the limits of this known art, the only countermeasure is to set a high threshold, though this is attended by the added risk that the complete filling of the mould will be detected too late and the changeover will not take place in time.

Consequently this invention is based on the desire to provide a process of this kind which detects the complete filling of the cavity dependably and in good time, whilst remaining stable in the event of disturbances due to chance pressure fluctuations during the filling phase.

This task is fulfilled by the invention as defined in the claims. The invention provides a process for determining the changeover point that functions surely and reliably, and largely precludes the production of defective mouldings or die-castings due to premature or belated changeover.

The invention is explained in more detail below with reference to illustrations showing a typical embodiment.

BRIEF DESCRIPTION OF THE DRAWINGS

FIG. 1 An injection moulding device for producing a plastic injection moulding, suitable for applying the process according to the invention.

FIGS. 2a, b An injection device and graph of the pressure inside the mould cavity versus time during a first part of the filling phase.

FIGS. 3a, b The injection device of FIG. 2a and graph of pressure, respectively, during a second part of the filling phase.

FIG. 6 A block diagram of algorithmic processing of measured values by the process according to the invention shown schematically.

DESCRIPTION OF THE PREFERRED EMBODIMENTS

Figure 4A:
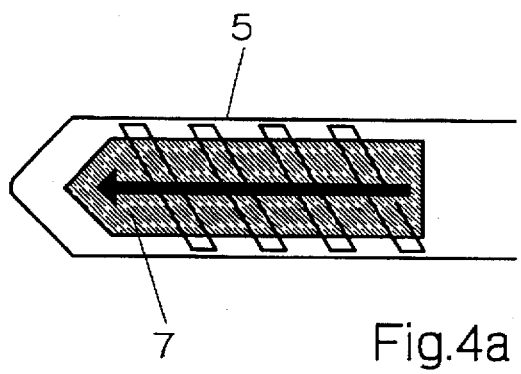
FIGS. 4a, b The injection device of FIG. 2a and graph of pressure, respectively, upon reaching the changeover point and in the neighborhood of the changeover.
Figure 4B:
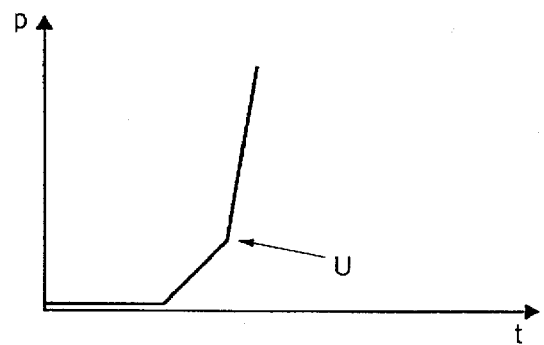

The injection moulding device in FIG. 1 has a metal mould 1 enclosing a cavity 2 in which the moulding is formed. The mould 1 is closed and opened by a typically hydraulic clamping unit 3. For preparing and injecting the moulding material an injection device 4 is provided, comprising an injection cylinder 5 with a hopper 6 at the top for feeding the material and a screw 7 arranged axially displaceable and rotatable inside it. The movements of the screw 7 are determined by a control system 8. Located in the wall of the cavity 2 is a pressure sensor 9 linked to a controller 10, which in turn is connected with the control system 8. The pressure sensor 9 could also be located behind an ejector pin; in any case it is inside the cavity 2.

At the beginning of an injection cycle, moulding material usually in the form of granulate is fed in through the hopper 6 into the injection cylinder 5, and melted by rapid rotation of the screw 7 accompanied by a reverse movement of screw 7 (FIG. 2a). In this first part of the filling phase, no pressure is built up yet in the cavity 2 of the mould 1 (FIG. 2b).

At the beginning of the subsequent second part of the filling phase the tip of the screw 7 is distanced from the tip of the injection cylinder 5, and the front end of this is filled with molten injection material (FIG. 3a). In the course of this second part, the screw 7 is pushed forward and the cavity 2 is filled with injection material. The forward movement is controlled to a filling program which sets the delivery rate as a function of time. The pressure in the cavity 2 increases.

As soon as the cavity 2 is filled completely, the filling phase ends and the hold pressure phase begins. The pressure rises abruptly versus time (FIG. 4a).

Figure 5A:
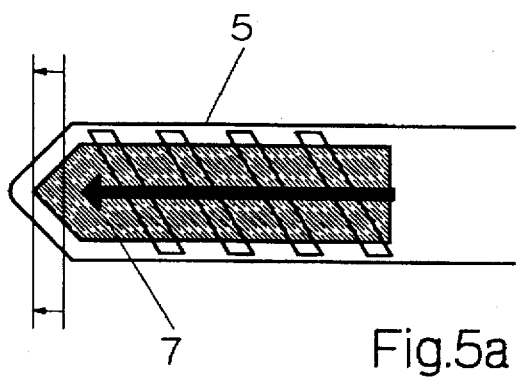
FIGS. 5a, b The injection device of FIG. 2a, and graph of pressure, respectively, during and including the hold pressure phase.
Figure 5B:
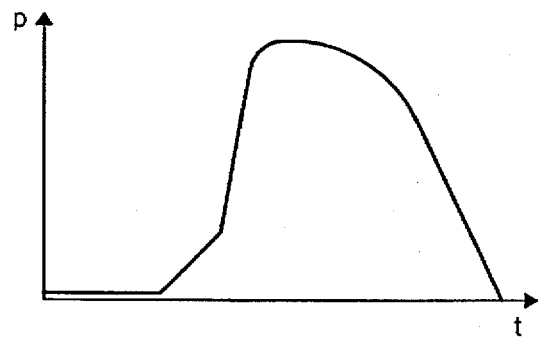

Coinciding as exactly as possible with this time, i.e. at the ideal changeover point U, the changeover from the filling program to the hold pressure program takes place, after which the pressure curve in the cavity 2 is regulated according to certain setpoints. For this purpose, the pressure is monitored by the pressure sensor 9 (FIG. 1) and the measured result is transmitted to the controller 10, which in turn acts on the control system 8 so as to maintain the preset pressure. The control system 8 then positions the screw 7 axially; at this stage it is usually still advanced slightly (FIG. 5a). The preset pressure may be a function of time (FIG. 5b), dropping back to its original level after a steep rise, because the injection material cools and contracts.

As already stated, the determination of the changeover point between the filling phase and the pressure hold phase is crucially important to the quality of plastic injection mouldings and die-castings. To perform this determination, already in the filling phase the pressure in the cavity 2 is monitored by the pressure sensor 9 and at regular intervals (typically every 10 msec) a measured value is transmitted to the controller 10. After a measurement the current measured value $p_0$ is processed together with the values $p_{-1}$ and $p_{-2}$ recorded respectively 10 and 20 msec previously. After 10 msec, a new current value $p_0$ is then determined, while the previous measured value $p_0$ becomes value $p_{-1}$ and this becomes $p_{-2}$.

Figure 7A:
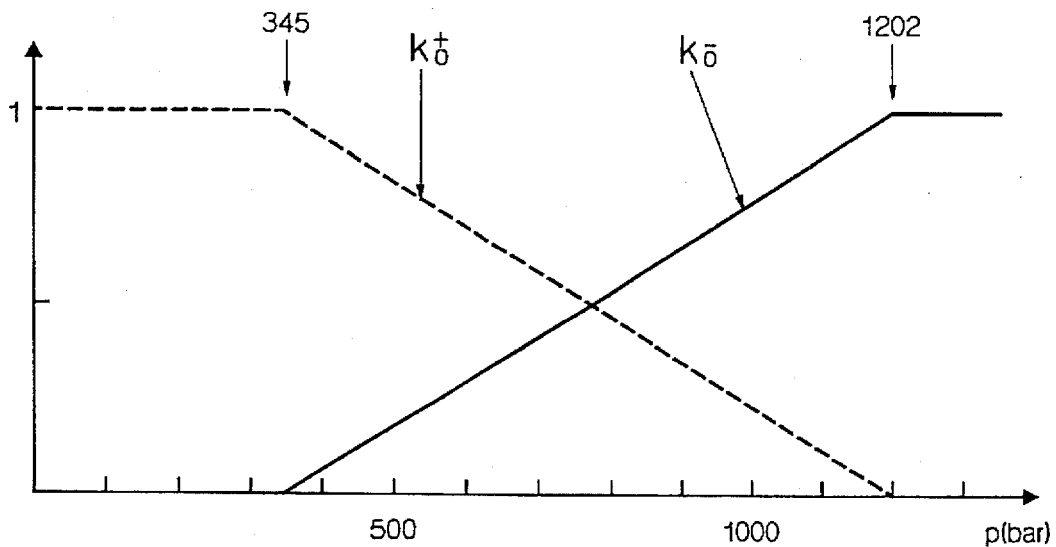
FIGS. 7a, b Graphs of classification functions for the current measured value and the last two values measured before it.

Algorithmic processing of the measured values $p_0$, $p_{-1}$ and $p_{-2}$ takes place in a computing unit in the controller 10 in several stages, in accordance with the fuzzy logic methods. First, two classification variables each are derived in classification stages $K_0$, $K_{-1}$ and $K_{-2}$ from the measured values $p_0$, $p_{-1}$ and $p_{-2}$ (fuzzification), by applying first and second classification functions $k_0^+$, $k_0^-$, $k_{-1}^+$, $k_{-1}^-$ and $k_{-2}^+$, $k_{-2}^-$ the measured values $p_0$, $p_{-1}$ and $p_{-2}$ respectively. The first classification function $k_0^+$ has the value 0 up to a lower pressure limit of 345 bar, then it rises linearly till it reaches 1 at 1202 is shown in FIG. 7a bar. The second classification function is complementary to the first one, i.e. it is added to this to form a constant, in this case 1.

Figure 7B:
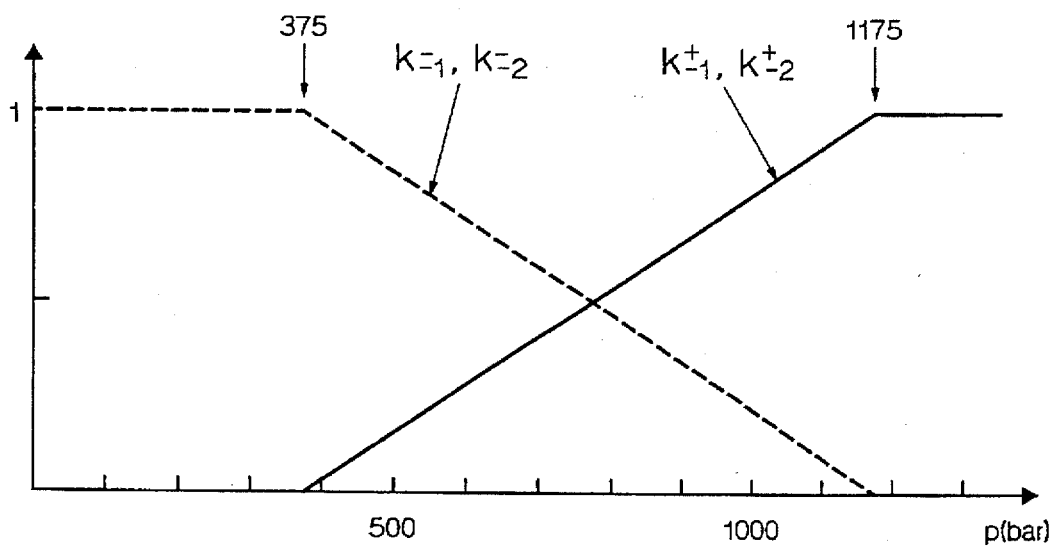

The first classification function $k_{-1}^+$ for the measured value $p_{-1}$ corresponds qualitatively to the classification function $k_0^+$ for the current measured value $p_0$ already described, except that it rises from 375 bar and reaches the value 1 at 1175 bar as shown in FIG. 7b. The second classification function $k_{-1}^-$ is in turn complementary to the first one. The classification functions $k_{-2}^+$ and $k_{-2}^-$ for the measured value $p_{-2}$ correspond exactly to those for the measured value $p_{-1}$ in the case described here.

The classification variables $k_0^+(p_0)$, $k_0^-(p_0)$, $k_{-1}^+(p_{-1})$, $k_{-1}(p_{-1})$, $k_{-2}^+(p_{-2})$ and $k_{-2}^-(p_{-2})$ resulting from the evaluation of the classification functions (the arguments or notations $p_0$, $p_{-1}$ and $p_{-2}$ will be omitted henceforth) are combined in a logic stage V (interference) and weighting variables $g^-$, $g^0$ and $g^+$ are derived from them. For this, intermediate variables are first obtained by forming minima via part magnitudes of the magnitude of the classification variables and scaling them in part, i.e. with firm factors, in this case $\geq 1$, multiplying and then arriving at the weighting variables by forming maxima via intermediate variables in each case. Taken individually:

$$g^- = \max\ [0.5\min(k_0^+, k_{-1}^+, k_{-2}^-),$$
$$0.2\min(k_0^-, k_{-1}^+, k_{-2}^+),$$
$$0.2\min(k_0^-, k_{-1}^+, k_{-2}^-)]$$

-continued
$$g^0 = \max\ [0.5\min(k_0^+, k_{-1}^+, k_{-2}^-),$$
$$0.5\min(k_0^+, k_{-1}^-, k_{-2}^-),$$
$$0.2\min(k_0^-, k_{-1}^+, k_{-2}^-),$$
$$0.6\min(k_0^-, k_{-1}^-, k_{-2}^+)]$$

$$g^+ = \max\ [1.0\min(k_0^-, k_{-1}^+, k_{-2}^-)]$$

Obviously each of the minima leading to an intermediate variable will, via a triple, form classification variables, each of which is composed of classification variables derived from the various measured values $p_0$, $p_{-1}$ and $p_{-2}$. In particular, one of the two classification variables $k_0^+$, $k_0^-$ derived from the current measured value $p_0$ always appears as argument.

Figure 8:
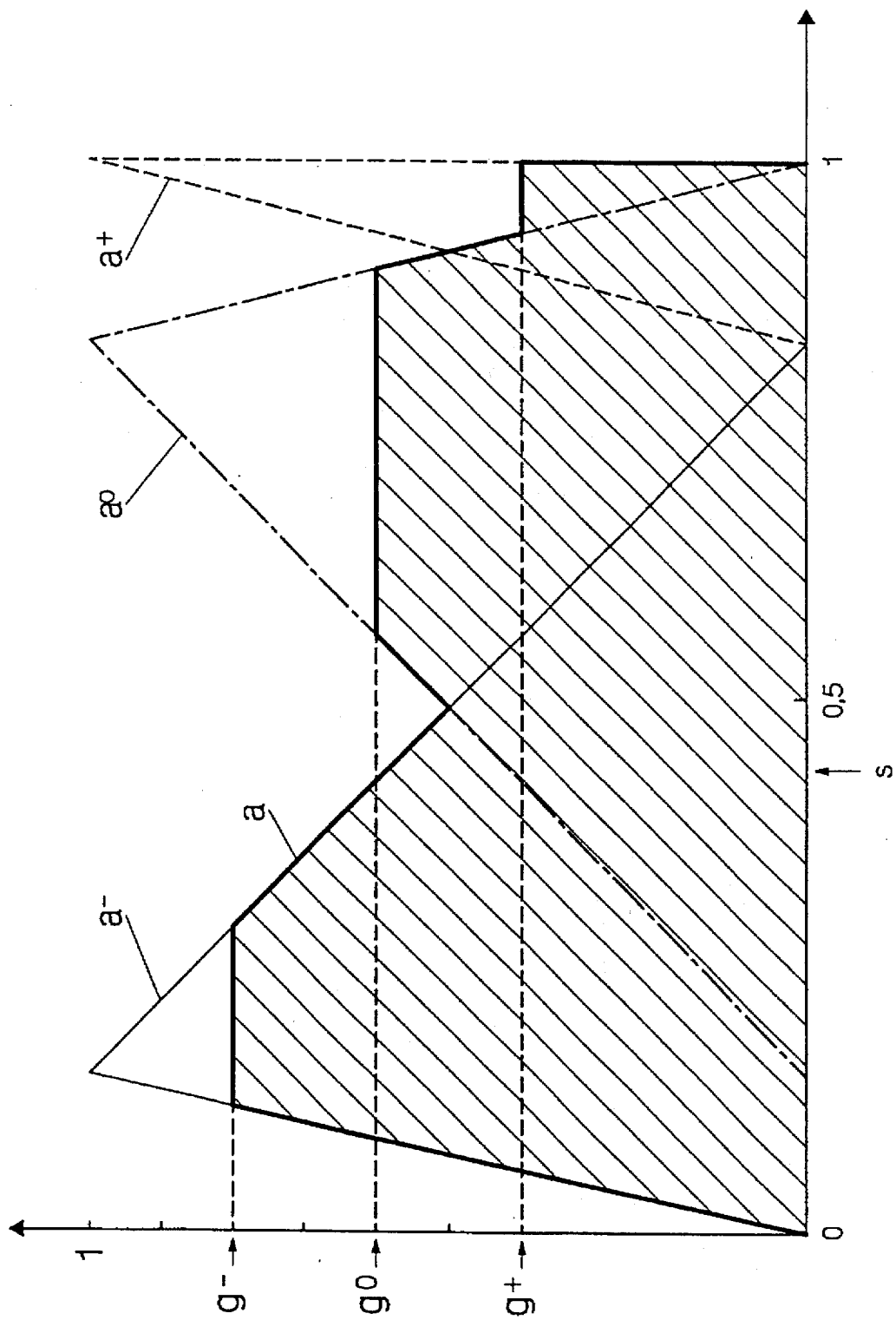
FIG. 8 Graph of evaluation functions for determining a switching value.

In an evaluation stage A, from the weighting variables $g^-$, $g^0$ and $g^+$ a real switching value s is derived, in this case lying between 0 and 1 (defuzzification). For this, the weighting values $g^-$, $g^0$ and $g^+$ with fixed evaluation functions $a^-$, $a^0$ and $a^+$ are combined (FIG. 8). The graphs of the evaluation functions have centroids clearly transposed against each other, i.e. the median corresponding to the x component of the centroid is clearly greater at $a^+$ that at $a^0$, while at $a^0$ it is clearly greater than at $a^-$. The carriers of the functions are likewise displaced correspondingly, although they overlap broadly. In this case the evaluation functions are very simple. They rise linearly throughout from 0 to 1, before dropping likewise linearly from 1 to 0.

Combination of the weighting variables $g^+$ with the evaluation function $a^+$ into a modified evaluation function is performed simply by cutting off the latter at the value of the weighting variable $g^+$, i.e. the minimum of the evaluation function a and a constant function with the value $g^+$ is formed. The procedure with the evaluation functions $a^0$ and $a^-$ is analogous. Finally, from the evaluation functions modified in this way, a switching function is arrived at by forming the maximum, its graph corresponding consequently to the union of the graphs of the modified evaluation functions.

To determine the switching value s, the median of the switching function s is formed corresponding to the x component of its centroid. Obviously the bigger the weighting variable assigned, the more each evaluation function will influence the switching value by displacing it against its own median.

If the switching value s lies below a threshold of 0.5, it will ultimately be deduced in a decision stage E (FIG. 6) that the changeover point has not been reached yet. If on the other hand the switching value oversteps the threshold, it is deduced that the changeover point has been reached and switchover to the hold pressure program has taken place.

With classification functions, logic rules and evaluation functions and methods as indicated above, very good results have been obtained over a wide application area. Nevertheless far-reaching deviations from the example described are possible. In particular, further optimization and adaptation to specific applications may lead to an algorithmic processing of the measured values differing in details. It is also possible to include a different number or selection of measured values in the processing.

We claim:

1. A process for determining a changeover point in the production of an injection moulding or die-casting, whereby employing an injection device, a cavity of a mould is filled according to a filling program up to the changeover point after which a pressure in the cavity curve is generated according to a hold pressure program, performing several successive measurements of the pressure inside the cavity and determining after each measurement whether the changeover point has been reached or not by algorithmic processing of the current measured pressure value and previous measured pressure values in a computing unit, characterized by the algorithmic processing of the measured pressure values by functional combination of classification pressure variables derived from the measured pressure values using fuzzy logic.

2. Process according to claim 1, characterized by using the two last measured pressure values recorded in addition to the current pressure measured value to determine whether the changeover point has been reached or not.

3. Process according to claim 1, characterized by the measured pressure values being recorded at regular time intervals.

4. Process according to claim 3, characterized by the time interval between two successive measurements not exceeding 20 msec.

5. A process for determining a changeover point in the production of an injection moulding or die-casting, whereby employing an injection device, a cavity of a mould is filled according to a filling program up to the changeover point after which a pressure in the cavity curve is generated according to a hold pressure program, performing several successive measurements of the pressure inside the cavity and determining after each measurement whether the changeover point has been reached or not by algorithmic processing of the current measured pressure value and previous measured pressure values in a computing unit, characterized by:

the algorithmic processing of the measured pressure values by functional combination of classification pressure variables derived from the measured pressure values using fuzzy logic;

a first classification pressure variable being derived from each measured pressure value by a first classification function; and the first classification function having a constant value at low pressure values and rising at an interval beginning with a positive lower pressure limit.

6. Process according to claim 5, characterized by a second classification pressure variable being derived from each measured pressure value by evaluating each measured pressure value in a second classification function.

7. Process according to claim 6 characterized by the second classification function being complementary to each first classification function.

8. Process according to claim 5, characterized by the lower pressure limit lying between 300 and 450 bar in each case.

9. Process according to claim 5, characterized by first classification function taken to evaluate the current measured pressure value having its lower pressure limit lower than with the other first classification functions.

10. A process for determining a changeover point in the production of an injection moulding or die-casting, whereby employing an injection device, a cavity of a mould is filled according to a filling program up to the changeover point after which a pressure in the cavity curve is generated according to a hold pressure program, performing several successive measurements of the pressure inside the cavity and determining after each measurement whether the changeover point has been reached or not by algorithmic processing of the current measured pressure value and previous measured pressure values in a computing unit, characterized by:

the algorithmic processing of the measured pressure values by functional combination of classification pressure variables derived from the measured pressure values using fuzzy logic;

deriving at least two weighing variables from the classification pressure variables in a logic stage using fuzzy logic; and determining the change over point using said weighing variables.

11. Process according to claim 10, characterized by deriving three weighing variables from the classification pressure variables the logic stage.

12. Process according to claim 10, characterized by the generation of intermediate variables by forming minima in the logic stage via part magnitudes of the magnitude of the classification pressure variables and deriving the weighing variables from the intermediate variables by further combination.

13. Process according to claim 12, characterized by the part magnitude of classification pressure variables via which a minimum is formed containing at least one of the classification pressure variables derived from the current measured pressure value.

14. Process according to claim 12, characterized by the combination of intermediate variables into weighing variables by maximum formation via part magnitudes of the magnitude of the intermediate variables after possible scaling of these.

15. Process according to claim 10, characterized by the formation in an evaluation stage on the basis of the weighing variables of a switching value, from which it is deduced whether the changeover point has been reached or not.

16. Process according to claim 15, characterized by the derivation in the evaluation stage from a weighting variable and an evaluation function assigned to the weighting variable—whereby the evaluation functions assigned to the various weighting variables differ—of a modified evaluation function, which with the same carrier increases with the value of the weighting variable so that ultimately a switching function is formed as maximum of the modified evaluation functions, from which the switching value is derived.

17. Process according to claim 16, characterized by the evaluation functions differing in their medians and the switching value being formed by forming the median of the switching functions.

18. Process according to claim 16, characterized by the modified evaluation function being determined as the minimum of the evaluation function and of the constant function corresponding to the weighting variable.

19. Process according to claim 15, characterized by the exact deduction of the reaching of the changeover point from the switching value when this value exceeds a threshold.

* * * * *